United States Patent Office 3,404,043
Patented Oct. 1, 1968

3,404,043
METAL COATING COMPOSITION AND PROCESS
Gaillard W. Dell, Detroit, Mich., assignor to Hooker Chemical Corporation, Niagara Falls, N.Y., a corporation of New York
No Drawing. Filed Nov. 10, 1964, Ser. No. 410,296
16 Claims. (Cl. 148—6.2)

ABSTRACT OF THE DISCLOSURE

A composition for forming a protective coating on aluminum-containing surfaces which consists essentially of an aqueous acidic solution containing hexavalent chromium ions, fluoride ions, and at least 0.01% molybdenum as an activator for the composition. The aluminum surface to be coated is maintained in contact with this solution for a period sufficient to form the desired coating thereon.

---

This invention relates to an improved composition and process for coating metal surfaces and more particularly relates to improved compositions and methods for chemically coating aluminum and aluminum alloy surfaces to provide corrosion resistant and paint bonding coating on such surfaces.

Many compositions and processes has been proposed in the past for forming chemical films on surfaces of aluminum, and particularly surfaces of aluminum and aluminum alloys. From a commercial standpoint, the most successful of these processes are those wherein the aluminum containing surface to be coated is contacted with an acidic solution containing a source of hexavalent chromium. In such processes, the attempt has been made to provide a method which is not only useful in treating various types of aluminum and aluminum alloys, but also to provide a coating solution which is relatively simple to prepare initially and which is easily maintained in effective coating condition during use.

For the most part, these prior art compositions have been aqueous acidic solutions containing a source of hexavalent chromium ions and a source of fluoride ions. It has also been the general practice to add to these basic compositions various additional anions or cations in order to obtain specific objectives, such as activation of the solution in order to obtain increased coating weight and coating efficiency. Exemplary of such modified compositions is that set forth in U.S. Patent 2,796,370, wherein ferricyanide is utilized as the modifying or activating anion.

In the commercial operation of chromate-fluoride, ferricyanide activated solutions for coating aluminum, a number of operational difficulties have been encountered. These solutions must always contain a certain minimum quantity of ferricyanide ion in order to preserve the coating rate and coating efficiency in the solution at levels which are commercially acceptable from the standpoints of both quality and economy. It is known that the ferricyanide ion is sensitive to temperature degradation at temperatures above about 50 degrees C., and unless care is constantly exercised to avoid exceeding this temperature, even at localized areas within the operating tank, the ferricyanide becomes degraded and incapable of maintaining the solution in acceptable coating-forming condition. Additionally, it has been found that these ferricyanide activated solutions are relatively sensitive to acidity and, thus, require considerable maintenance of the necessary acidity within a fairly narrow range. Moreover, these solutions are found to lose their coating ability merely upon standing at room temperature without use and the replenishment of them is complicated because the ferricyanide and chromate-fluoride component must be added separately to the solution and must be maintained, prior to addition, in separate containers in order to avoid reaction between these components.

It is, therefore, an object of the present invention to provide an improved chromate-fluoride coating solution which is capable of operations at high speeds and high coating efficiencies to form a corrosion resistant, paint receptive coating on aluminum containing surfaces.

Another obect of the present invention is to provide an improved chromate-fluoride coating solution which is capable of operating at high coating rates and high coating efficiencies over a wide range of pH and temperature values.

A further object of the present invention is to provide an improved process for coating aluminum containing surfaces, which process is capable of being maintained in optimum coating-forming condition by replenishing with a single replenishing material.

A still further object of the invention is to provide an improved process for coating aluminum surfaces which process is economical to use, easy to control and maintain in optimum coating-forming condition and which is capable of providing adherent, corrosion resistant coatings.

These and other objects of the invention will become apparent to those skilled in the art from the description of the invention which follows.

Pursuant to the above objects, the present invention includes a coating composition which comprises an aqueous acidic solution, substantially free of lithium ions, antimony ions, tin ions and cations of Group II–A of the periodic table and which contains hexavalent chromium ions, fluoride ions and at least 0.01 percent of molybdenum.

More specifically, the composition of the present invention is an aqueous acidic solution which is substantially free of lithium ions, antimony ions, tin ions and cations of Group II–A of the periodic table, namely beryllium, magnesium, calcium, strontium, and barium. It has been found, in the present composition, that not only do the above ions not add any beneficial properties to the composition but, in many instances, are in fact detrimental to the operation and maintenance of the coating solution and to the protective coatings which are produced. Accordingly, it is desirable that the coating solutions of the present invention be substantially free of these ions. By "substantially free," it is meant that the solutions are free of at least amounts of these ions which are detrimental to the solution or coating produced. It is not necessarily intended, however, to exclude minor amounts of these ions which are not detrimental, such as amounts which may occur in the water used in making up the aqueous solution, e.g., less than about 0.05% by weight of the solution.

The aqueous acidic coating solutions of the present invention contain hexavalent chromium ions in an amount sufficient to provide the desired chromium coating on the aluminum surfaces treated therewith. Desirably, these solutions contain hexavalent chromium ions, calculated as $CrO_3$, in an amount within the range of about 0.05 to about 1 percent, weight/volume (w./v.), i.e., percent weight per unit volume of solution. The hexavalent chromium ions may be added to the solution in many suitable forms, such as chromic acid, or one or more of the water soluble or water dispersable salts of chromic acid. Exemplary of the salts which may be used are the sodium, potassium or ammonium salts such as the chromates and dichromates, as well as admixtures thereof both with each other and/or with chromic acid.

The fluoride ion is present in the subject composition in an amount sufficient to cause attack of the aluminum containing surface to be coated and to effect formation of the resulting coating on this surface. Desirably, the fluoride ion is present in an amount within the range of about 0.16 to about 2.7 percent w./v. As with the hexavalent chromium ion, the fluoride ions may be added to the present composition in many convenient forms, including various fluorine-containing compounds which are capable of ionizing in the aqueous acidic solutions of the invention to provide fluoride ions. Exemplary of such fluorine containing compounds which may be used are hydrofluoric acid, fluosilicic acid, fluoboric acid, as well as the various water soluble or water dispersable salts thereof such as the sodium, potassium, and ammonium salts.

As has been indicated thereinabove, there is also included in the present composition, at least 0.01 percent w./v. of molybdenum. It is believed that in the present composition, the molybdenum acts as an activator which makes it possible to obtain and maintain high coating weights and coating efficiencies. Although the maximum amount of the molybdenum used has not been found to be critical, it has been found that when amounts of molybdenum substantially in excess of about 0.4 percent w./v. are used, no appreciable additional improvements in coating weight and coating efficiencies are obtained. Accordingly, it is desirable that the molybdenum be present in the coating solution in amounts within the range of about 0.01 to about 0.4 percent w./v. The molybdenum may be added to the coating solution in the form of various compounds which are ionizable in the solution, such as molybdic acid, as well as various water soluble or water dispersable salts thereof which will provide the desired molybdenum ion when oxidized in the solution by the chromic acid or chromic acid salts. Exemplary of such molybdenum containing salts which may be used are the sodium, potassium, or ammonium salts of molybdic acid.

In addition to the above components, in many instances it has also been found desirable to include in the present composition an aluminum fluoride complex ion, which ion is desirably present in an amount equivalent to about 0.22 to about 3.2 percent w./v. of $Al(F)_x$. The aluminum fluoride complex ion is expressed as $Al(F)_x$ because, when used, it is present in the operating solution as an equilibrium of $Al(F)$ ions which may contain from 1 to 6 fluoride atoms per aluminum atom. In the solutions of the present invention, it has been found that this equilibrium averages out to be approximately equivalent to the $Al(F)_3$ ion. Accordingly, as used in the specification and claims, the expression $Al(F)_x$ is intended to represent any aluminum fluoride ion and the quantities thereof refer to an amount of such ion equivalent to the $Al(F)_3$ ion. This aluminum fluoride complex ion, when used, may be incorporated in the present coating solution as such, or may be formed in the solution as a complex from free aluminum and fluoride ions. In the latter instance, the fluoride may be present as hydrofluoric acid, fluoboric fluosilicic acid, or the like. Where the aluminum fluoride complex is added as such, it may be prepared by dissolving aluminum oxide ($Al_2O_3$) in water and hydrofluoric acid in appropriate proportions to obtain the requisite parts of $Al(F)_3$ for the composition.

Particularly preferred compositions of the present invention are those falling within the following formulation:

| Solution component: | Concentration percent w./v. |
|---|---|
| Hexavalent chromium ions (calculated as $CrO_3$) | 0.2–0.5 |
| Fluoride ions | 0.16–1.6 |
| Molybdenum | 0.03–0.1 |
| $Al(F)_x$ complex | 0.22–1.9 |

The solutions of the present invention may be used to form coatings on surfaces containing aluminum, such as aluminum itself or aluminum alloys which are predominantly aluminum, using various coating techniques, such as dipping, brushing, spraying, flooding, or the like. Preferably, the solutions of the present invention are applied to the aluminum surfaces after these surfaces have been subjected to conventional cleaning procedures which free the surface to be treated of oil, grease, oxides, and the like. Additionally, the present solutions may be applied to the aluminum surfaces by atomizing the solution on the surface in a heated condition. Generally stated, this atomization application technique includes the steps of preliminarily heating the aluminum or aluminum alloy surface to be coated to a temperature above about 65 degrees centigrade and atomizing on the heated surface a quantity of the coating solution sufficient to form the desired coating but insufficient to cause the droplets of atomized coating solution to coalesce or puddle on the surface. The coating on the aluminum surface results from the substantially instantaneous flashing or volatilization of the liquid from the solution, so that each individual atomized particle droplet remains substantially in the locus of its original contact with the surface treated.

Although the coating process of the present invention may be carried out effectively and with good efficiency over a wide range of solution temperatures and solution acidities, it has been found that the rate of coating may be improved and the coating efficiency increased by the concurrent selection and control of the degree of the acidity of the solution and its temperature of application. With regard to the temperature, it has been found that as the temperaure of the operating solution is increased from room temperature, i.e., about 20 degrees centigrade up to about 50 degrees centigrade, the coating rate rapidly increases and in some instances it is possible to obtain an increase in the coating rate of from 2 to 5 times that obtained at room temperature. At solution temperatures within the range of about 50 to about 70 degrees centigrade the coating rate has been found to increase much more slowly and, for all practical purposes, has been found to be substantially uniform throughout this temperature range. It is, therefore, preferred to utilize the solutions of the present invention at solution temperatures within the range of about 50 to about 70 degrees centigrade. High temperatures than 70 degrees centigrade may be employed, for example, temperatures of 80 degrees centigrade or even up to the solution boiling point, but no particular advantages in terms of increased coating rates are obtained by operating at such higher temperatures.

With regard to the pH of the operating solutions of the present invention, it has been found that this, as with the temperature, affects the coating rate and coating efficiencies of the solution being applied to the aluminum containing surfaces. Accordingly, it is desirable that the coating solution have a pH within the range of about 1.1 to about 2.3, and preferably in the range of about 1.6 to about 2.1. This pH range refers to measurements taken by using an electrical pH meter, employing a glass electrode and a calomel electrode, by immersing the electrodes in fresh portions of the operating solution and observing the indicated values.

In addition to the pH of the operating solution, it is also desirable that the operating solution have a concentration within the range of about 7 to about 15 points, and that once the concentration is established within this range, it is maintained within about ±0.5 point of the established value. The concentration of the operating solution in points is determined by the following procedure:

To a ten milliliter sample of the operating solution there is added 25 milliliters of 50 percent sulfuric acid and 2 drops of orthophenanthroline ferrous complex (ferroin) indicator. This solution is then titrated with 0.1 N ferrous sulfate in dilute sulfuric acid until the solution changes through blue to a reddish-brown color. The concentration points of the operating solution are the number of milliliters of the 0.1 N titrating solution used. It is to be appreciated, that although the operating solution of the present invention is desirably used at a concentration within the range of about 7 to 15 points, operation of the solution at both higher and lower point concentrations is not only possible, but in some instances, is preferred.

Following the application of the coating solution of the present invention to the aluminum containing surfaces to be treated, the thus-coated surfaces are then desirably rinsed with water. Either spray or immersion techniques for the water rinse may be used, with rinsing times of about 3 to 5 seconds duration being typical. Following the water rinse, if desired, the coated surface may be given an additional rinse with deionized water or with a dilute solution of hexavalent chromium, e.g., $CrO_3$. This latter rinse is preferably effected by spraying, rinsing times of about 3 to 5 seconds duration at temperatures within the range of about 55 to 65 degrees centigrade being typical. After the rinsing of the coated aluminum surface has been completed, the surfaces are preferably dried so as to remove any surface moisture. The coatings thus produced on the aluminum surfaces are slightly colored and vary in appearance from iridescent to light gold to yellow to brown. The color changes in the coatings produced may be used as a guide to the coating weights obtained, the darker colors being produced with higher coating weights and the lighter colors resulting from lower coating weights.

In formulating the operating solutions of the present invention, a make-up composition, containing the components desired in the operating solution, is admixed with water in amounts suitable to provide concentrations of the components within the ranges as set forth hereinabove. Normally, in addition to the above indicated components, the make-up composition may also contain an inorganic acid such as nitric acid or the like in order to provide the desired acidity or pH. Suitable make-up compositions are those falling within the following formulation:

| Component: | Parts by weight |
|---|---|
| $CrO_3$ | 15–20 |
| HF | 4–7 |
| Inorganic acid, such as $HNO_3$ | 1–5 |
| Molybdenum activator composition | 2–5 |
| $Al(F)_x$ (average $AlF_3$) | 3–6 |

It will be appreciated that this is a single package make-up composition as compared to the prior art compositions wherein separate packaging of some of the make-up component was often necessary.

In the operation of the process of the present invention, the components of the coating solution are depleted. Accordingly, in order to maintain these components in the operating solution within the preferred ranges which have been set forth hereinabove, it is desirable, in order to obtain a continuous operation, to periodically replenish the operating solution. One advantage of the present composition is that, as in formulating the operating solution, this replenishing may be effected using a single package replenishing material, as opposed to many of the prior art compositions wherein separate addition of the components during replenishing is necessary. As with the make-up composition, in addition to the hexavalent chromium, fluoride, molybdenum and aluminum fluoride complex components, it may also be desirable to include in the replenishing material an inorganic acid, such as nitric acid, sulfuric acid, hydrochloric acid, and the like, so as to maintain the acidity or pH of the operating solution within the desired ranges as have been indicated hereinabove. Additionally, where the fluoride component is added as hydrogen fluoride, rather than fluosilicic acid or fluoboric acid, it may also be desirable to include in the replenishing material a quantity of boric acid, to act as a buffer for the fluoride ions. This addition of boric acid may also be desirable in making up the original operating solution, when the fluoride ion is added as hydrogen fluoride, and particularly where the aluminum fluoride complex ion is not included in the original solution. Where boric acid is included in the original operating solution, it is typically added in an amount within a range of about 0.1 to about 0.2 percent w./v., although amounts up to its maximum solubility in the solution may be used.

A single package replenishing material suitable for use in maintaining the operating solution of the present invention in optimum coating forming condition may contain the following components in the amounts indicated:

| Components: | Parts by weight |
|---|---|
| Hexavalent chromium (calculated as $CrO_3$) | 15–20 |
| HF | 7–12 |
| Acid | 1.4–7 |
| Alkali metal molybdate | 3–6.5 |
| $Al(F)_x$ (average $AlF_3$) | 0.6–1.6 |

Additionally, this composition may also contain about 1.2 to about 2 parts by weight of boric acid ($H_3BO_3$).

A preferred replenishing material, having particular utility for use with a continuous strip line operation, is one containing the following components in the amounts indicated:

| Components: | Parts by weight |
|---|---|
| $CrO_3$ | 18–20 |
| HF | 10–12 |
| $HNO_3$ | 5–7 |
| Sodium molybdate ($Na_2MoO_4 \cdot 2H_2O$) | 3–6 |
| $Al(F)_x$ (average $AlF_3$) | 0.8–1.5 |

A preferred replenishing material, particularly suitable for production operations in which the parts to be coated are moved through a spray installation on a monorail conveyor, is one having the following components in the amounts indicated:

| Components: | Parts by weight |
|---|---|
| $CrO_3$ | 15–17 |
| HF | 8–11 |
| $HNO_3$ | 4.5–6.5 |
| Sodium molybdate ($Na_2MoO_4 \cdot 2H_2O$) | 3.5–6.5 |
| $Al(F)_x$ (average $AlF_3$) | 1–1.6 |

As has been indicated hereinabove, the presence in the operating solution of the present invention of foreign cations, that is, cations other than the sodium, potassium or ammonium ions normally introduced, together with the fluoride or molybdenum ion, have been found to be undesirable and to detrimentally affect the coating rate and coating efficiencies which may be obtained by using the solution of the present invention in the manner in which it has been described above. In particular, trivalent chromium ions in amounts in excess of about 0.1 percent by weight of the solution have been found to have an appreciably adverse effect on the coating rate and coating efficiencies obtained. Accordingly, it has been found to be particularly advantageous to maintain the solutions of the present invention in optimum operating conditions by operating these solutions in conjunction with an ion exchange unit of the type and by the procedures described in U.S. Patent 2,967,791, issued Jan. 10, 1961. In operating the present solution with such an ion exchange unit, which employs a cation exchange resin, the solutions are maintained free of metallic cations other than aluminum, which occur in the solutions as aluminum floride complex ions, and these complexes are controlled in concentration in the solution by the ion exchange unit.

By the method of the present invention, corrosion resistant adherent coatings are formed on the aluminum or aluminum alloy surfaces treated in the matter of a few seconds, typically about 1 to abut 20 seconds. Moreover, by modifying the composition as to the molybdenum content, fluoride content, aluminum fluoride complex content, as well as to the pH and acidity it is possible to maintain a coating rate which is sufficiently fast as to form coatings on continuous strips of aluminum or aluminum alloys, which coatings have a weight in the range of about 15 to about 40 milligrams per square foot, in contact times of about 1 to 2 seconds.

In order that those skilled in the art may better understand the present invention and the manner in which it may be practiced, the following specific examples are given. It is to be understood that these examples are presented for illustrative purposes only and are not intended to be taken as a limitation on the present invention. In these examples, unless otherwise indicated, temperatures are in degrees centigrade and amounts are in percent weight/volume. Additionally, the term "Coating Efficiency" refers to the quantity of coating formed relative to the amount of metal dissolved from the surface of the metal being coated and is, specifically, the ratio obtained by dividing the metal loss, in milligrams per square foot of surface treated, by the coating weight on the same area, in milligrams per square foot. Thus, as this numerical ratio decreases, the coating efficiency increases and the lowest numbers represent the highest efficiency of coating formation.

EXAMPLE 1

A solution was prepared containing 0.5 percent $CrO_3$, 0.3 percent fluoride, as $HBF_4$, 0.1 percent molybdenum added as $Na_2MoO_4$, and 0.37 percent $Al(F)_x$ (average $AlF_3$). The solution had a pH of 1.75, a total fluoride of 0.55 percent, and after placement in a 2,000 gallon tank was elevated in temperature to 50 degrees centigrade.

Aluminum No. 3105 builder stock was coated by spraying portions of the above solution thereon to attain contact times with the surface varying from about 7 to about 15 seconds. The resultant coatings were adherent, light-gold in color and had coating weights varying from about 20 to about 50 milligrams per square foot, average, depending upon the contact time. The coating efficiency calculated as metal loss in milligrams per square foot, divided by the coating weight in milligrams per square foot averaged 0.2. This solution was maintained free of trivalent chromium ions and at the above levelt of aluminum fluoride complex by constantly cycling a small portion of the solution through an ion exchange resin column filled with Dowex 50, 20–100 mesh cation exchange resin, and after many thousands of surface feet of aluminum had been processed through the solution, the coating obtained was still similar in appearance and the coating weight and the coating efficiency remained substantially constant.

EXAMPLE 2

A solution was prepared containing 0.25 percent $CrO_3$, 0.02 percent fluoride, as HF, 0.02 percent molybdenum, added as $Na_2MoO_4$, and 0.22 percent $Al(F)_x$ (average $AlF_3$). The solution had a pH of 1.68, a total fluoride of 0.17 percent and when applied by spraying at 50 degrees centigrade for 7–15 seconds contact time to the same aluminum builder stock employed in Example 1, produced coatings that were approximately the same weight range, had an average coating efficiency of 0.25.

EXAMPLE 3

A 750 gallon tank for immersion coating was filled with a solution containing 0.5 percent $CrO_3$, 0.25 percent fluoride as $H_2SiF_6$, 0.4 percent molybdenum, added as $Na_2MoO_4$, 0.23 percent chromic nitrate and 0.22 percent $Al(F)_x$ (average $AlF_3$). The solution had a pH of 1.55, a total fluoride of 0.4 percent and was raised in temperature to about 50 degrees centigrade. 3003 aluminum processed through the solution by immersion for 30 seconds to 1 minute produced adherent, gold-colored coatings having an average weight of 40.8 milligrams per square foot. At this temperature, the average coating efficiency was 0.25.

This solution was operated at varying temperatures by spraying portions of the solution on 3003 cleaned aluminum panels for a 15-second contact time. At 38 degrees centigrade the coating weight was 55 milligrams per square foot, at 43 degrees centigrade, it was 62 milligrams per square foot, at 50 degrees centigrade, it was 84 milligrams per square foot, at 57 degrees centigrade, it was 81 milligrams per square foot, at 66 degrees centigrade, it was 67 milligrams per square foot, and at 71 degrees centigrade, it was 50 milligrams per square foot.

EXAMPLE 4

A solution was prepared containing 0.49 percent $CrO_3$, 0.04 percent fluoride, as HF, 0.09 percent molybdenum, added as $Na_2MoO_4$, and 0.23 percent $Al(F)_x$ (average $AlF_3$). The solution contained a total fluoride of 0.2 and had a pH of 1.68. The solution was heated to 50 degrees centigrade and sprayed on 3003 aluminum panels for a 15-second contact time to produce a uniform adherent coating having an average coating weight of 78 milligrams per square foot at a coating efficiency of 0.19.

The above bath, when operated at 32 degrees centigrade, and under otherwise identical conditions, was found to produce adherent coating having an average weight of 21 milligrams per square foot, when operated at 38 degrees centigrade produced coatings having an average weight of 54 milligrams per square foot; when operated at 54 degrees centigrade produced coatings having an average weight of 98 milligrams per square foot; when operated at 60 degrees centigrade produced coatings having an average weight of 98 milligrams per square foot; when operated at 66 degrees centigrade produced coatings having an average weight of 86 milligrams per square foot; and when operated at 71 degrees centigrade produced coatings having an average weight of 76 milligrams per square foot.

To portions of the above bath, sodium hydroxide was added sufficient to produce a pH of 1.81 and under the same conditions of application at 50 degrees centigrade and on similar panels, an average coating weight of 77 milligrams per square foot was obtained at a coating efficiency of 0.20. To another portion of the solution, additional sodium hydroxide was added to produce a pH of 2.01 and when operated under similar conditions produced coating having an average weight of 71 milligrams per square foot at a coating efficiency of 0.24. To another portion of the above solution, sufficient sodium hydroxide was added to produce a pH of 2.12 and when operated under similar conditions was found to produce adherent coatings having an average weight of 45 milligrams per square foot at a coating efficiency of 0.27. To another portion of the above solution, sufficient sodium hydroxide was added to produce a pH of 2.28, and when this solution was operated, under similar conditions, adherent coatings were produced having an average weight of 22 milligrams per square foot at a coating efficiency of 0.28.

EXAMPLE 5

Another solution was prepared containing 0.49 percent $CrO_3$, 0.09 percent molybdenum as $Na_2MoO_4$, 0.02 percent fluoride, as HF and 0.266 percent $Al(F)_x$ (average $AlF_3$). This solution had a pH of 1.70 and a total fluoride content of 0.20 percent. This solution, operating at 50 degrees centigrade was sprayed on 3003 aluminum panels for 15 seconds contact time and produced an average coating weight of 37 milligrams per square foot at a coating efficiency of 0.28. 0.48 percent $HNO_3$ was added to this solution to convert the solution into one having a pH of 1.21 and when operated under similar conditions produced adherent coatings having an average weight of 66 milligrams per square foot at a coating efficiency of 0.27.

The above examples are repeated using other sources of hexavalent chromium and fluoride, including sodium and potassium dichromate and fluosilicic acid, respectively, to obtain similar results. The coatings thus produced are found to be excellent paint base coatings and when painted give good results in the 5 percent salt spray, humidity, adhesion and physical tests.

While there have been described various embodiments of the invention, the compositions and methods described are not intended to be understood as limiting the scope of the invention as it is realized that changes therewithin are possible and it is further intended that each element recited in any of the following claims is intended to be understood as referring to all equivalent elements for accomplishing substantially the same results in substantially the same or equivalent manner, it being intended to cover the invention broadly in whatever form its principles may be utilized.

What is claimed is:

1. A composition suitable for forming a protective coating on aluminum-containing surfaces which consists essentially of an aqueous acidic solution which contains an effective coating amount of hexavalent chromium ions, fluoride ions in an amount effect to attack the aluminum surface being treated and at least 0.01% of molybdenum, as a simple molybdenum compound.

2. The composition as claimed in claim 1 wherein there is also present an aluminum fluoride complex.

3. A composition suitable for forming a protective coating on aluminum containing surfaces which consists essentially of an aqueous acidic solution which contains, in percent w./v., 0.05 to 1% hexavalent chromium ions, calculated as $CrO_3$, 0.16 to 2.7% fluoride ions, and 0.01 to 0.4% molybdenum, as a simple molybdenum compound.

4. The composition as claimed in claim 3 wherein the solution also contains, in percent w./v., 0.22 to 3.2 $Al(F)_x$ complex.

5. The composition as claimed in claim 4 wherein the solution contains in percent w./v., 0.2 to 0.5 hexavalent chromium ions, calculated as $CrO_3$, 0.16 to 1.6 fluoride ions, 0.03 to 0.1 molybdenum, and 0.22 to 1.9 $Al(F)_x$, complex.

6. A method of forming a protective coating on aluminum-containing surfaces which comprises contacting the surface to be treated with an aqueous acidic solution which consists essentially of an effective coating amount of hexavalent chromium ions, fluoride ions, in an amount effective to attack the surface being treated and at least 0.01% of molybdenum, as a simple molybdenum compound, and maintaining the aqueous acidic solution in contact with the surface to be treated until the desired protective coating is formed.

7. The method as claimed in claim 6 wherein the aqueous acidic solution also contains an aluminum fluoride complex ion.

8. A method for forming a protective coating on aluminum containing surfaces which comprises contacting the surface to be coated with an aqueous acidic solution which consists essentially of, in percent w./v., 0.05 to 1% hexavalent chromium ions calculated as $CrO_3$, 0.1 to 2.7% fluoride ions, and 0.01 to 0.4% molybdenum, as a simple molybdenum compound, and maintaining the aqueous acidic solution in contact with the surface to be treated until the desired protective coating is formed.

9. The method is as claimed in claim 8 wherein the aqueous acidic solution also contains, in percent w./v., 0.22 to 3.2 $Al(F)_x$ complex.

10. The method as claimed in claim 9 wherein the aqueous acidic solution contains, in percent w./v., 0.2 to 0.5 hexavalent chromium ions, calculated as $CrO_3$, 0.16 to 1.6 fluoride ions, 0.03 to 0.1 molybdenum, and 0.22 to 1.9 $Al(F)_x$ complex.

11. A replenishing material for forming solutions for coating aluminum containing surfaces which consists essentially of, in parts by weight, 15 to 20 $CrO_3$; 7 to 12 HF; 1.4 to 7 inorganic acid; 3 to 6.5 alkali metal molybdate; and 0.6 to 1.6 $Al(F)_x$ (average $AlF_3$).

12. The replenishing material as claimed in claim 11 wherein there is contained in parts by weight, 18 to 20 $CrO_3$; 10 to 12 HF; 5 to 7 $HNO_3$; 3 to 6 sodium molybdate; and 0.8 to 1.5 $Al(F)_x$.

13. The replenishing composition as claimed in claim 11 wherein there is contained in parts by weight, 15 to 17 $CrO_3$; 8 to 11 HF; 4.5 to 6.5 $HNO_3$; 3.5 to 6.5 sodium molybdate; and 1 to 1.6 $Al(F)_x$.

14. An aluminum surface having a coating thereon produced in accordance with the method as claimed in claim 6.

15. An aluminum surface having a coating thereon produced in accordance with the method of claim 10.

16. A make-up composition, suitable for forming aqueous acid solutions for coating aluminum containing surfaces which consists essentially of, in parts by weight, 15 to 20 $CrO_3$; 4 to 7 HF; 1 to 5 inorganic acid; 2 to 5 molybdenum activator composition; and 3 to 6 $Al(F)_x$ (average $AlF_3$), wherein the activator composition is a water soluble salt of molybdic acid.

References Cited

UNITED STATES PATENTS

| | | | |
|---|---|---|---|
| 2,868,679 | 1/1959 | Pimbley | 148—6.2 |
| 2,948,643 | 8/1960 | Pimbley | 148—6.2 X |
| 2,967,791 | 1/1961 | Halversen | 148—6.27 X |
| 3,009,842 | 11/1961 | Steinbrecher | 148—6.2 |
| 3,066,055 | 11/1962 | Pimbley | 148—6.2 X |
| 3,113,051 | 12/1963 | Pimbley | 148—6.27 X |

RALPH S. KENDALL, *Primary Examiner.*